United States Patent [19]

Charron

[11] 4,190,941
[45] Mar. 4, 1980

[54] METHOD OF MAKING COOLED VALVES FOR INTERNAL COMBUSTION ENGINES AND VALVES OBTAINED THEREBY

[75] Inventor: Francis Charron, Croissy-sur-Seine, France

[73] Assignee: Basset Bretogne Loire-B.B.L., Sevres, France

[21] Appl. No.: 907,699

[22] Filed: May 19, 1978

[30] Foreign Application Priority Data

May 27, 1977 [FR] France .................. 77 16384

[51] Int. Cl.² .................................. B21C 23/22
[52] U.S. Cl. ............................ 29/156.7 C; 72/258; 123/41.34; 123/41.41; 123/188 A
[58] Field of Search ............... 29/156.7 C, 156.7 B, 29/156.7 R, 157.1 A, 157 C, DIG. 47; 72/258; 123/188 AA, 188 A, 188 R, 41.41, 41.34

[56] References Cited

U.S. PATENT DOCUMENTS

| 1,254,976 | 1/1918 | Bugatti | 123/41.41 |
| 2,423,203 | 7/1947 | Oldham | 29/157 C |
| 3,477,112 | 11/1969 | Yerkins | 29/157 C |
| 3,716,902 | 2/1973 | Pearce | 29/157 C |
| 4,080,700 | 3/1978 | Muller | 29/157 C |

FOREIGN PATENT DOCUMENTS

| 2240572 | 2/1974 | Fed. Rep. of Germany | 123/188 A |
| 1438740 | 6/1976 | United Kingdom | 123/41.34 |

Primary Examiner—Daniel C. Crane
Attorney, Agent, or Firm—Steinberg & Blake

[57] ABSTRACT

The invention relates to a method of manufacturing cooled valves for internal combustion engines. From a first cylindrical billet is formed a valve blank by drilling an axial blind bore therein and machining an inner circumferential groove at the blind end portion of said bore. From a second cylindrical billet is machined a cylindrical rod-shaped core and at least two coolant feed and return flow channels, said core being inserted into the bore of said blank. Then said blank and said core are assembled by a hydrostatic extrusion.

6 Claims, 9 Drawing Figures

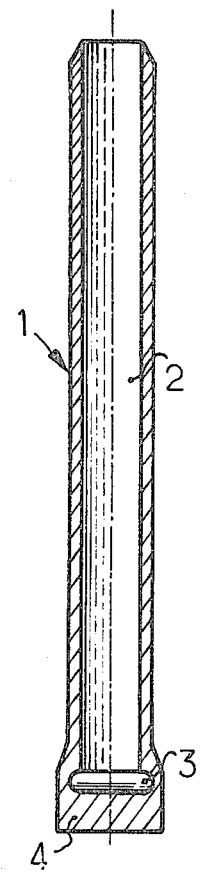
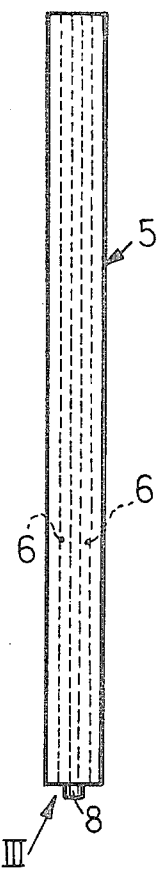
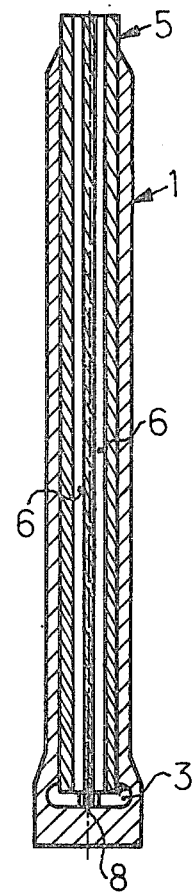
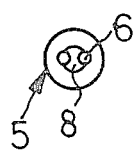
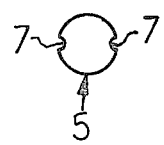
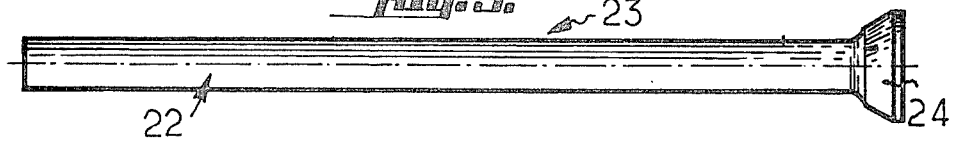

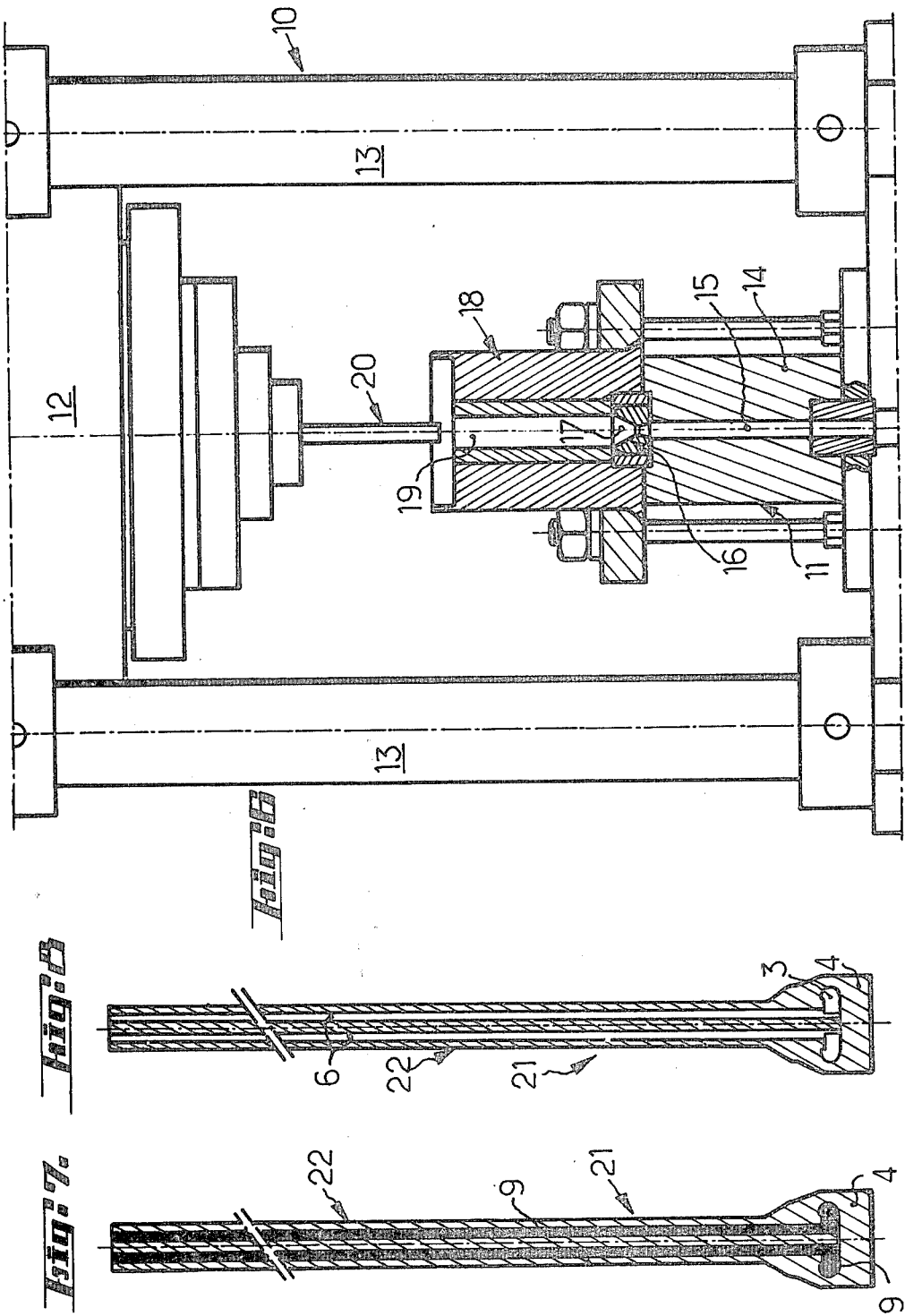

METHOD OF MAKING COOLED VALVES FOR INTERNAL COMBUSTION ENGINES AND VALVES OBTAINED THEREBY

BACKGROUND OF THE INVENTION

The present invention relates generally to a method of manufacturing valves and is more particularly directed to a process of making cooled valves for internal combustion engines as well as by way of new industrial products the valves obtained by carrying out said method.

As known, the so-called mushroom-type or tulip-shaped or poppet valves cooled by a cooling medium or coolant are made in at least two parts, namely: the head or disc and the stem or spindle, with a view to providing the coolant feed and return flow ducts or channels, respectively, therein. Both parts are then assembled or connected together either by being screwed into each other or by being welded or brazed together or by being hooped, clamped or similarly bound to each other.

Such assembling processes suffer however from certain drawbacks. In the case of welded constructions, breaking failures are likely to occur in view of the sensitiveness or tendency to cracking of the materials generally used for making valves.

In the case of brazed structures, the assemblies are likely to undergo damages, loosenings, separations, partings or like impairments owing to differential heat expansion phenomena. In the case of screwthreaded constructions, gradual unscrewings or like loosenings have been noticed under the combined action of differential thermal expansions and vibrations to which the valves were subjected.

The inconveniences mentioned hereinbefore would most frequently result in the detachment through breaking failure of the valve head or disc and its dropping or falling into the engine working cylinder thereby causing very substantial damages.

SUMMARY OF THE INVENTION

The invention aims at overcoming or removing such inconveniences and its main object is to provide a valve which in the finished condition consists of a construction without any transversely extending assembling connections or like bonds.

For this purpose, the invention provides a method of manufacturing cooled valves in particular for internal combustion engines, which is characterized in that it comprises the steps of:

providing a first substantially cylindrical billet or like stock made from a suitable extrudable material, making a valve blank or slug therefrom, for instance by piercing or drilling an axial blind bore and for instance by machining a circumferential inner groove at the blind end of said bore, providing a second substantially cylindrical billet or like stock made from a suitable extrudable material possibly different from that of the first billet, machining the same into a cylindrical rod-like core having a diameter complementary of, i.e., mating with or corresponding to that of said blind bore and machining on either side of said core at least two coolant feed and return ducts, respectively, as thoroughfare channels open at their opposite ends; inserting the core into the bore of said blank, said ducts opening with one end into said groove, preferably hydrostatically extruding said blank-and-core assembly or combination thus obtained so as to form the valve stem or spindle to its finished size and at the same time provide a good cohesion or bonding between the blank and the core, and performing a shaping of the valve head or disc.

According to another characterizing feature of the invention and prior to the extruding step, said ducts and said groove are filled with a substance or product having a low melting point and then after the extrusion step said valve is heated in order to melt or fuse and to remove, discharge or withdraw said substance for instance by draining the same away.

In the blank thus obtained, the valve head is shaped to its final configuration either by deformation under pressure, forging, flow-turning or hydro-spinning or the like, or by removing material such as chips or cuttings through machining or tooling operations or like processing steps.

DESCRIPTION OF THE DRAWINGS

The invention will be better understood and further objects, advantages, characterizing features and details thereof will appear more clearly as the following explanatory description proceeds with reference to the accompanying diagrammatic drawings given by way of non limiting example only illustrating a presently preferred specific embodiment of the invention and wherein:

FIG. 1 is a longitudinal sectional view showing a valve blank obtained after the first stage or operating step of the method according to the invention;

FIG. 2 is a elevational view illustrating a rod-like core formed with a pair of feed and return flow ducts, respectively, for the cooling fluid, provided during a second stage or operating step of the method;

FIG. 3 is a view seen in the direction of the arrow III of FIG. 2;

FIG. 4 is an alternative embodiment to the embodiment of FIG. 3 showing a modification of the cooling channels or ducts;

FIG. 5 is a longitudinal sectional view showing the valve after the core has been inserted into the blank or slug;

FIG. 6 is a view in partial longitudinal section of an extrusion press adapted to shape the valve stem or spindle in a third stage or operating step of the method;

FIG. 7 is a longitudinal sectional view of the valve after it has been removed from the press in the case where the cooling ducts are filled with a packing or stuffing substance with a view to limiting the collapsing or squeezing of such ducts during the extruding step;

FIG. 8 is a longitudinal sectional view of the valve after the filling substance has been removed therefrom; and FIG. 9 is an elevational view of a valve in its finished condition after shaping of its head or disc.

DESCRIPTION OF THE PREFERRED EMBODIMENT

In FIG. 1 is illustrated the first stage or operating step of the process according to the invention.

There is provided a substantially cylindrical billet or like stock 1 made from a material capable of being extruded such as for instance heat-resisting steel, with an initial diameter at least equal to that of the valve head in the finished state, and then is formed therein for instance through piercing or drilling, an axial blind bore 2 at the blind end portion of which is machined for instance through electro-erosion for small bores or through turning for bores with larger diameters, an inner circumferential groove 3 as a passage-way for the flow of cooling medium within the valve head.

Then is accomplished an outer machining step for instance through bar-turning, cutting off or like free-turning on a lathe so as to reduce the outer diameter of the billet 1 except for its blind end portion in order to leave a heel portion 4 thereon inside of which is provided the groove 3.

In FIGS. 2 to 5 is illustrated the second stage or operating step of the method.

From a second substantially cylindrical billet or like stock 5 of a suitable extrudable possibly different material is machined or tooled a core member 5 as a cylindrical rod with an outer diameter complementary of, i.e., mating with or corresponding to that of the blind bore 2 of the billet 1. Two coolant flow feed and return channels 6, respectively, are then machined in that core. Such lengthwise extending channels 6 are provided either as thoroughfare ducts pierced or drilled into the core 5 and extending fully therethrough to open at both of its opposite ends (FIGS. 2 and 3), or as grooves 7 cut into the outer side wall surface of the core 5 over the whole length thereof (FIG. 4). Such channels or grooves may be either straight or curved and extend in parallel or non parallel relationship.

In the case of the channels 6, there is also machined in the core 5 a projecting end portion or protrusion 8 forming a partition between both channels 6 opening at that end.

Then, prior to slipping or fitting the core 5 into the blind bore 2 of the blank or slug 1 with the projection 8 of said core bearing on or abutting the inner bottom or closing end wall of the heel 4 of the valve head, there is possibly carried out a surface treatment of the outer side wall surface of the core 5 and of the inner surface of the blind bore 2 of the blank 1, so as to promote the adhesion or cohesive bonding between the core and the blank during a further stage or operating step of the process. Such a treatment consists for instance in a degreasing and scouring or pickling or like cleaning step and in a metallizing or like metal-spraying step.

In FIGS. 6 to 8 is shown the third stage or operating step of the method. Prior to the valve extrusion step proper, once the core has been fitted into the blank, the coolant passage-ways (channels 6 and groove 3) are filled with a substance having a low melting point, such as for instance a eutectic compound melting for instance at about 100° C. This compound is poured thereinto in the melted state and after its solidification through cooling, the outer ports of the channels 6 opening at the free end of the core 5 are closed by being stopped or sealed off in order to avoid any loss of compound through liquefaction and spilling thereof during the extrusion step. Such a stopping or sealing is carried out for instance by means of screw-threaded metal stoppers or plugs screwed into the tapped openings of the channels or ducts 6.

The extrusion step, preferably performed hydrostatically in order to achieve a better homogeneousness of the extruded material, takes place in a press 10 comprising a stationary lower frame 11 and an upper frame 12 movable towards and beyond said stationary frame 11 by means of guide columns, pillars or like standards or uprights 13. On the stationary frame 11 is provided a support or holder 14 formed with an axial bore 15 and which carries a die or the like 16 the bore 17 of which is flared or tapering at its top portion and axially aligned in registering relationship with the bore 15. The bore diameter of the die 16 in its non-tapered or non-flared portion would correspond to that desired for the valve stem whereas the diameter of the bore 15 in the support or holder 14 which serves as a receiving chamber for the extruded valve is slightly larger.

About the blank 1 is fitted an annular container 18 the bore 19 of which is aligned in registering relationship with the aforesaid bores 15, 17 and has a diameter slightly larger than the diameter of the heel portion 4 of the valve head. The movable frame 12 carries at its end opposite to or confronting the stationary frame 11 a piston, plunger or like ram 20 axially aligned with the centre line axis of the container 18.

With the piston 20 in its upper or upward retracted position, i.e., raised beyond the container 18, the blank is inserted with its end having the smaller diameter into the bore 19 of the container 18 before the inside of the press 10 is filled with hydraulic fluid.

Then through displacement of the movable support 12 along the slideways 13, the piston 20 is directed and moves into the inside of the bore 19 of the container 18 so as to push and force the valve stem through the die 16. The free end of the piston does not directly engage the free end of the valve heel portion 4 but acts thereupon through the agency of a pressure fluid separating same. The extrusion step is completed when the stop-like heel portion is received within the bore 17 of the die 16.

The valve 21 thus obtained together with its stem or spindle 22 formed to the desired diameter and length is shown in FIG. 7 with the coolant passage-ways still filled in the examplary embodiment shown with the stuffing or packing compound 9 whereby the channels of the cooling system could be obtained during the extrusion step with a predetermined reduced diameter.

After that extrusion step and in the examplary embodiment involved, the valve is heated for instance by being dipped into boiling water so as to cause the filling compound 9 to melt and to be removed upon withdrawal of the closing stoppers or plugs so as to provide the valve shown in FIG. 8.

In a last stage or operating step of the method, there remains to carry out the shaping of the valve head at the heel portion 4 thereof thereby eventually obtaining the valve 23 in its final condition together with its stem 22 and its head or disc 24 such as shown in FIG. 9.

It should be pointed out that the extrusion step carried out through hydrostatic extrusion requires less power than the other cold-extrusion methods in view of a rather small coefficient of friction within the die and the absence of any friction within the press container.

With this method of hydrostatic extrusion, it is possible moreover to produce articles the structure of which exhibits substantially uniform properties throughout the length of the extruded part or section. Furthermore the method enables valves to be made from materials which are not normally extrudable in a cold condition with conventional processes.

It should be understood that the invention is not at all limited to the embodiment described and given by way of illustrative example only but it comprises all the technical equivalents of the means described as well as their combinations if same are carried out and used within the scope of the appended claims.

I claim:

1. A method of making unitary cooled valves such as for internal combustion engines, comprising the steps of:

providing a first substantially cylindrical billet formed of an extrudable material and drilling an axial blind bore in said billet to form a valve blank therefrom;

machining an inner circumferential groove at the blind end portion of said bore;

providing a second substantially cylindrical billet formed of an extrudable material, forming a cylindrical rod-shaped core from said second billet with a diameter complementary of that of said blind bore and forming at least two longitudinally extending flow channels in said core, said channels opening at their opposite ends;

inserting said core into the bore at said valve blank with said channels opening into said groove to form an assembly;

filling said channels and said groove with a substance having a relatively low melting point, said substance being in its melted state;

allowing said substance to solidify;

extruding after solidification of said filling substance said assembly so as to form a valve having a desired size and at the same time provide a good cohesion between the first billet and the core;

heating said valve so as to cause the filling substance to melt and to be removed from the channel and groove; and shaping the valve to form a valve head.

2. A method according to claim 1, wherein, prior to inserting said core into said first billet, a surface treatment on the outer side wall surface of said core and of the surface of said first billet is carried out.

3. A method according to claim 1, wherein the step of filling said channels and said groove with a substance having a low melting point comprises choosing a substance with a melting point lower than the melting point of the material forming said billets.

4. A method according to claim 1, including the step of providing said second billet of an extrudable material different from that of said first billet.

5. A method according to claim 1, wherein said extruding step is a hydrostatic extruding operation.

6. A unitary cooled valve for an internal combustion engine, wherein said valve is obtained by carrying out the method according to claim 1.

* * * * *